May 31, 1927.

R. W. DAVENPORT 1,630,731

CONTROL CIRCUITS FOR MOTORS

Filed March 2, 1926

INVENTOR.
Ransom W. Davenport

BY
Ira L. Nickerson
ATTORNEY.

Patented May 31, 1927.

1,630,731

UNITED STATES PATENT OFFICE.

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY.

CONTROL CIRCUITS FOR MOTORS.

Application filed March 2, 1926. Serial No. 91,853.

This invention relates in general to the control of prime movers and more particularly to electric motors arranged for automatic control. It has special application to the so called mechanically operated refrigerating systems or machines, especially the small machine intended for use in the home, wherein the control of the system is effected by cutting in or cutting out the electric motor used as the prime mover.

It is customary to provide automatic control of such systems by means of automatic switches operated by variations in the temperature of some point or points within the refrigerator, as by a thermostat placed within the chamber to be cooled, or by a pressure thrown switch controlled by the low side pressure which serves as an approximate index of the low temperature attained. Such arrangements are doubtless reasonably satisfactory under ordinary conditions, since they reduce the cost of operation and prevent excessively low temperatures in the food preserving compartments. They have certain disadvantages, however, resulting from the fact that the owner has no control over the machine in the event of extraordinary circumstances, such as the need of quickly freezing an unusual amount of water or other liquid. It is, moreover, often the case that the automatic element fails to function so that the machine either runs continuously or not at all. In the latter instance the owner is entirely without service until repairs can be made.

Figure 1:
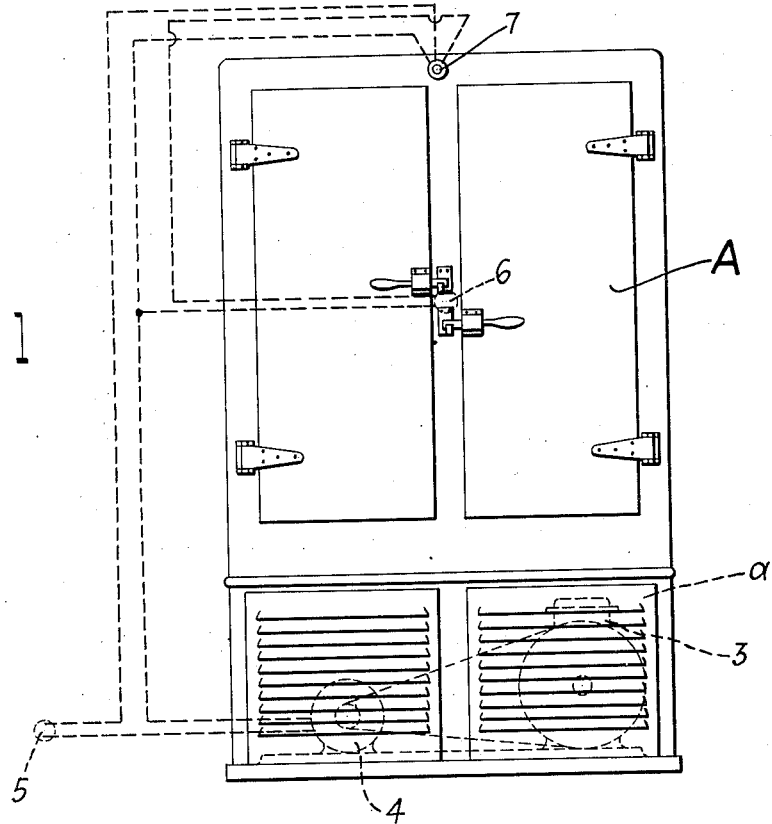
Figure 2:
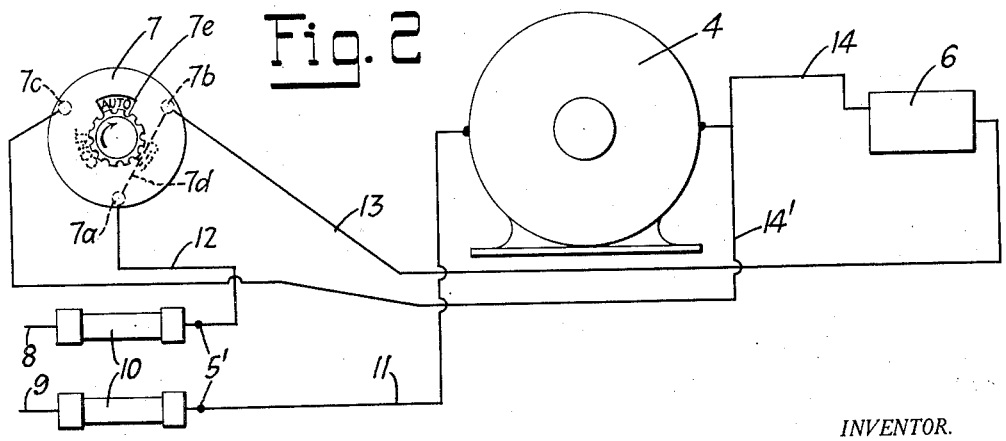

One object of the invention is to provide means for securing improved flexibility in the control of electrical motors. Another object is to provide a control system characterized by a novel combination of manual and automatic elements. Still another object is to improve the control systems for mechanically operated refrigerating machines. Other objects will be apparent from the detailed description which follows:

In order to illustrate the invention one concrete embodiment thereof is shown in the accompanying drawings in which:

Fig. 1 is a front elevational view of a household refrigerator, certain elements of the system as well as the electrical connection being indicated by broken lines; and Fig. 2 is a circuit diagram.

In the drawing A indicates a conventional type of refrigerating outfit of the mechanically operated type for household use. The upper part of cabinet A is arranged to provide the refrigerating or food preserving chamber with walls insulated against the transfer of heat and beneath it a compartment $a$ in which is placed the apparatus for producing the desired thermodynamic effects in the refrigerating chamber including the compressor 3 and the prime mover or electric motor 4 for driving the compressor. Since the invention relates directly to the control means for motor 4, the other elements and the manner of connecting the same to form the refrigerating system are not shown but they may be of any well known or desired type.

The motor 4 is arranged to be connected to a source of energy or power by an ordinary cable connection plugged into a wall or light socket 5 the connections comprising the electrical circuit being indicated by broken lines in Fig. 1. An automatically operated device is arranged to control the motor in response to the effects produced by operation of the system. Such a device may take the form of a thermostat or thermostatic switch 6 placed within the food storage chamber of the refrigerator and adjusted to disconnect the motor from the power source when the temperature of the storage chamber reaches a predetermined low temperature and to restore the connection when the temperature in the chamber rises to a certain predetermined point. In addition a manual control switch 7 is provided at some convenient point in the system and preferably mounted upon the exterior of cabinet A above the reach of children. These two control elements may be of any suitable or desired type but the preferred manner of connecting them into the motor circuit is illustrated in the circuit diagram in Fig. 2.

As indicated in Fig. 2, 8 and 9 are the power mains, 10 are the safety fuses and 5' are the terminals for the socket connection. From terminals 5' extend leads 11 and 12, the former going directly to one terminal of motor 4 and the other to terminal 7ª of switch 7. The particular form of manual switch 7 herein shown has two other terminals 7ᵇ and 7ᶜ. From terminal 7ᵇ extends a lead 13 to thermostat 6 and from the latter a lead 14 to the other terminal of motor 4. Lead 14 has a branch lead 14' which extends to terminal 7ᶜ of the switch. Switch 7 has a bridge piece 7ᵈ, or inter-connected contacts, on the rotatable part thereof arranged to engage and connect two adjacent terminals of the switch in each position of the rotatable member. The rotatable member has a disk with indicia on the same as follows: Auto, Off and Cont., which indicia are visible in turn through a window 7ᵉ in the casing. In the position shown the indicia Auto is visible and terminals 7ᵃ and 7ᵇ of the switch are inter-connected by the bridge piece 7ᵈ so that the thermostat 6 is in series with the switch in the connection of the power mains to the motor, the circuit comprising upper power terminal 5' lead 12, switch terminal 7ᵃ, bridge 7ᵈ, switch terminal 7ᵇ, lead 13, thermostat 6, lead 14, motor 4, lead 11 and the other power terminal 5'. Upon rotating the manual control switch 7 clockwise to the next position the indicia Cont. will become visible indicating that the connection is such as to make motor 4 run continuously, the circuit now being upper power terminal 5', lead 12, switch terminal 7ᵃ, bridge piece 7ᵈ, switch terminal 7ᶜ, lead 14', motor 4, lead 11, and the other power terminal 5'. On again stepping the manual control switch 7 around clockwise to the next position, the indicia Off becomes visible in window 7ᵉ and the bridge piece 7ᵈ connects terminals 7ᶜ and 7ᵈ of the switch so that the circuit thus formed has no connection with the upper of the power terminals and the motor is not energized either directly through the switch 7 or through thermostat 6.

With the arrangement described above it is clear that the manual element is so connected into the motor circuit as to accomplish any one of the following three results: (1) Put the motor in series with the automatic device across the power mains. (2) Put the motor directly across the mains; or (3) interrupt the current supply and stop the motor. Thus it will be apparent that the owner of the system has complete control over the operation of the same, and that, barring some serious defect in or accident to the motor or to the compressor, he has complete control of the functioning of the apparatus, can still have service in the event of failure of the automatic device, and can secure continuous operation of the system at will, as when large quantities of liquid are to be frozen within a short period.

It is to be understood that the invention has herein been disclosed in only one of its possible applications and that in adapting it to other control circuits changes and modifications in the connections and arrangements of elements may be made. Accordingly, the invention is not limited to the specific apparatus and arrangement herein shown and described but covers all modifications, changes and adaptations within the scope of the appended claims.

I claim as my invention:—

1. An electrical circuit comprising a motor, a source of electrical energy for operating said motor, automatically operated means for connecting said motor to and disconnecting it from said source, and a single manually operable control device interposed between said automatic means and said source for connecting and disconnecting said motor either through said automatic means or directly to said source.

2. An electrical circuit comprising a source of electrical energy, a motor arranged to be operated by said energy, a thermostat automatically controlling the connection between said motor and said source, and a single control device interposed between said thermostat and said source for connecting and disconnecting said motor manually either through said thermostat or directly to said source.

3. The combination in a mechanically operated refrigerating system having as a prime mover an electric motor arranged to be driven from a suitable source of energy, of control means for said system comprising means operating automatically as a resultant of the operation of said system for connecting and disconnecting said motor and said energy source, and a main control switch for controlling said motor manually or automatically through said means.

4. The combination with a chamber and with a heat engine for varying the temperature in said chamber, said engine including an electric motor and a source of power for operating said motor, of control means for said engine comprising means operating automatically in response to variations of temperature in said chamber for connecting and disconnecting said motor and said power source, and a main switch for entirely disconnecting said automatic means and for controlling said motor manually.

5. The combination with a chamber and with a heat engine for varying the temperature in said chamber, said engine including an electric motor and a source of power for operating said motor, of control means for said engine comprising a thermostatic switch within said chamber for connecting and disconnecting said motor and power source automatically in response to variations of temperature, and a single switch interposed between said thermostatic switch and said power source for disconnecting said thermostatic switch at will and for providing a manual control of said motor.

6. The combination in a self contained refrigerator of the mechanically operated type having a cabinet providing a refrigerating chamber and a compartment for the mechanical apparatus including an electric motor for driving the same and a connection to a source of power for driving the motor, of control means for said motor comprising a thermostatic switch within said chamber actuated automatically in response to variations in temperature therewithin, and a manually controlled multipole switch associated with said motor circuit for cutting out said automatic switch and providing manual control of said motor.

7. The combination in a self contained refrigerator of the mechanically operated type having a cabinet providing a refrigerating chamber and a compartment for the apparatus including an electric motor for driving the same and a connection to a source of power for driving the motor, of control means for said motor comprising a thermostatic switch within said chamber actuated automatically in response to variations in temperature therewithin, and a manually controlled switch on said cabinet connected with the circuit to said motor and arranged to put the motor in series with the thermostat switch across the power mains, to put the motor directly across the mains, or to interrupt the power supply to said motor.

Signed at Detroit, Wayne County, Michigan, this 27th day of February, 1926.

RANSOM W. DAVENPORT.